(12) United States Patent
Lee et al.

(10) Patent No.: US 10,298,529 B2
(45) Date of Patent: May 21, 2019

(54) METHOD, SYSTEM, AND RECORDING MEDIUM FOR MANAGING GROUP MESSAGE

(71) Applicant: NAVER Corporation, Seongnam-si (KR)

(72) Inventors: YungSeong Lee, Seongnam-si (KR); Dohoon Kim, Seongnam-si (KR); Jeong Hwa Kim, Seongnam-si (KR); Hyo Jung Kim, Seongnam-si (KR); Hak Jin Doh, Seongnam-si (KR); Sun Young Park, Seongnam-si (KR); Myongwon Seo, Seongnam-si (KR); Chan Hyuk Sung, Seongnam-si (KR); Seong Woo Sim, Seongnam-si (KR); Joseph Yeo, Seongnam-si (KR); Keonsu Lee, Seongnam-si (KR); Byoungseung Lee, Seongnam-si (KR); KyoHee Chang, Seongnam-si (KR); Hyeonji Jeon, Seongnam-si (KR); Munhyun Joo, Seongnam-si (KR); Kidoo Han, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 132 days.

(21) Appl. No.: 15/238,483

(22) Filed: Aug. 16, 2016

(65) Prior Publication Data

US 2017/0054664 A1    Feb. 23, 2017

(30) Foreign Application Priority Data

Aug. 17, 2015    (KR) .................. 10-2015-0115669

(51) Int. Cl.
*H04L 12/58* (2006.01)
*H04L 29/08* (2006.01)

(52) U.S. Cl.
CPC .............. *H04L 51/16* (2013.01); *H04L 51/32* (2013.01); *H04L 67/306* (2013.01)

(58) Field of Classification Search
CPC .... H04L 12/1813; H04W 4/14; H04W 88/02; G06F 3/0482; G06F 3/04842;
(Continued)

(56) References Cited

U.S. PATENT DOCUMENTS

| 7,111,044 B2 * | 9/2006 | Lee ..................... H04L 12/1827 709/204 |
| 2009/0063991 A1 * | 3/2009 | Baron .................... G06Q 10/10 715/751 |

(Continued)

FOREIGN PATENT DOCUMENTS

| JP | 2014013575 | 1/2014 |
| JP | 2014517617 | 7/2014 |

(Continued)

OTHER PUBLICATIONS

Korean Office Action dated Aug. 24, 2016 by the Korean Patent Office corresponding to Korean patent application No. 10-2015-0115669.

(Continued)

*Primary Examiner* — Aftab N. Khan
(74) *Attorney, Agent, or Firm* — Grer Burns & Crain, Ltd.

(57) ABSTRACT

Provided are a method, system, and non-transitory computer-readable medium for managing a group message. A message management method includes transmitting a group message in which a plurality of recipients are set at a terminal of a user; creating a group chatroom that includes the group message; receiving an individual message from a terminal of at least one recipient among the plurality of recipients; including the individual message in an individual (Continued)

chatroom that is created in association with each of the plurality of recipients; and displaying and providing the group chatroom and the individual chatroom as a bundled item.

8 Claims, 14 Drawing Sheets

(58) Field of Classification Search
CPC ............ G06Q 10/107; H04M 1/72547; H04M 2201/34; H04M 2201/36; H04M 2201/38; H04M 2250/06
See application file for complete search history.

(56) References Cited

U.S. PATENT DOCUMENTS

| | | | |
|---|---|---|---|
| 2011/0282953 A1* | 11/2011 | Lee | H04L 12/586 709/206 |
| 2012/0304079 A1* | 11/2012 | Rideout | H04L 12/1818 715/758 |
| 2012/0311052 A1* | 12/2012 | Lee | H04L 12/6418 709/206 |
| 2014/0310365 A1* | 10/2014 | Sample | H04L 51/16 709/206 |

FOREIGN PATENT DOCUMENTS

| | | |
|---|---|---|
| JP | 2015133038 | 7/2015 |
| JP | 2015523104 | 8/2015 |
| KR | 20070029983 | 3/2007 |
| KR | 20080003983 | 1/2008 |
| KR | 20110030613 | 3/2011 |
| KR | 10-2011-0116377 | 10/2011 |
| KR | 10-2011-0126421 | 11/2011 |
| KR | 20110126421 | 11/2011 |
| KR | 10-2013-0046492 | 5/2013 |
| KR | 20130046492 | 5/2013 |
| KR | 10-1464448 | 11/2014 |
| KR | 101464448 | 11/2014 |

OTHER PUBLICATIONS

Japanese Office Action dated Jul. 18, 2017 by the Patent Office of Japan corresponding to Japanese patent application No. 2016-136848.

* cited by examiner

METHOD, SYSTEM, AND RECORDING MEDIUM FOR MANAGING GROUP MESSAGE

CROSS-REFERENCE TO RELATED APPLICATION(S)

This application claims priority under 35 U.S.C. § 119 to Korean Patent Application No. 10-2015-0115669 filed on Aug. 17, 2015, in the Korean Intellectual Property Office (KIPO), the entire contents of which are incorporated herein by reference.

BACKGROUND

Field

One or more exemplary embodiments relate to technology for managing a group message to be transmitted to a plurality of recipients.

Description of Related Art

A messaging application that enables users to receive and transmit messages has become an essential element of a terminal. For example, a short message service (SMS), a multimedia messaging service (MMS), and the like, are generally used to transmit and receive text messages and/or video messages between terminals.

In general, a message may be saved based on a global criterion regardless of a sender of the message or other information. For example, messages may be saved and displayed sequentially in order from newest to oldest based on the time at which each message was received.

In such message saving method, if a user wants to manage a specific message, such as to research, to delete, and/or to retransmit the specific message, the user is required to verify the respective messages one by one in order in which the messages are saved.

SUMMARY

One or more exemplary embodiments provide a message management method, system, and non-transitory computer-readable medium that groups a group message transmitted to a plurality of recipients and a message transmitted and received between a user and a recipient of the group message based on the group message and manages the grouped messages.

At least one exemplary embodiment provides a message management method configured as a computer, the method comprising transmitting a group message in which a plurality of recipients are set at a terminal of a user; creating a group chatroom that includes the group message; receiving an individual message from a terminal of each of at least one recipient among the plurality of recipients; including the individual message in an individual chatroom that is created in association with each of the plurality of recipients; and displaying and providing the group chatroom and the individual chatroom as a bundled item.

In certain embodiments, the group message is included in the individual chatroom.

The individual chatrooms may be sorted based on the point in time at which the most recent message included in each individual chatroom was received or transmitted in the bundled item.

In certain embodiments, the individual chatroom is provided as a lower list of the group chatroom in the bundled item.

The individual chatroom may be classified into an individual chatroom that includes the individual message as a reply to the group message or a remaining individual chatroom in the bundled item.

In the bundled item, an identifier indicating the group message may be further included in the group chatroom.

In the bundled item, at least a portion of the items of the group chatroom and the individual chatroom are controllable to be in either a display state or a hide state, in certain embodiments.

In the bundled item, state information associated with the group message may be further included in at least one of the group chatroom and a representative item separately created in association with the group chatroom.

The displaying and providing may comprise adding the group message to the individual message and displaying the added group message in response to receiving a selection on the individual chatroom in the bundled item from the terminal of the user.

An individual message received or transmitted between a corresponding recipient and the user before a transmission point in time of the group message may be further included in the individual chatroom.

An individual chatroom that includes a message received or transmitted between at least one recipient among the plurality of recipients and the user may be additionally maintained as an item separate from the bundled item.

At least one exemplary embodiment also provides a non-transitory computer-readable medium storing a program to implement a method comprising transmitting a group message in which a plurality of recipients are set at a terminal of a user; creating a group chatroom that includes the group message; receiving an individual message from a terminal of at least one recipient among the plurality of recipients; including the individual message in an individual chatroom that is created in association with each of the plurality of recipients; and displaying and providing the group chatroom and the individual chatroom as a bundled item.

At least one exemplary embodiment also provides a message management system comprising a manager configured to create a group chatroom that includes a group message in response to receiving the group message in which a plurality of recipients are set from a terminal of a user, and to include an individual message in an individual chatroom that is created in association with each of the plurality of recipients in response to receiving the individual message from a terminal of each of at least one recipient among the plurality of recipients; and a provider configured to display and provide the group chatroom and the individual chatroom as a bundled item.

The group message may be included in the individual chatroom, in certain embodiments.

In certain embodiments, the individual chatrooms may be sorted based on the point in time at which the most recent message included in each individual chatroom is received or transmitted in the bundled item.

The individual chatroom is provided as a lower list of the group chatroom in the bundled item.

The individual chatroom may be classified into an individual chatroom that includes the individual message as a reply to the group message or a remaining individual chatroom in the bundled item.

In the bundled item, at least a portion of the items of the group chatroom and the individual chatroom may be controllable to be in a display state or a hide state.

The provider may be further configured to add the group message to the individual message and display the added group message in response to receiving a selection on the individual chatroom in the bundled item from the terminal of the user, and an individual message received or transmitted between a corresponding recipient and the user before a transmission point in time of the group message may be further included in the individual chatroom.

An individual chatroom that includes a message received or transmitted between at least one recipient among the plurality of recipients and the user may be additionally maintained as an item separate from the bundled item.

According to some exemplary embodiments, it is possible to further effectively manage messages by grouping and thereby saving a group message transmitted to a plurality of recipients and messages transmitted and received between a user and recipients of the group message based on the group message. Thus, it is possible to easily and conveniently verify messages relevant to the group message.

Also, according to some exemplary embodiments, it is possible to manage messages based on a group unit by adding and thereby saving a group message to a one-to-one chatroom created between a user and a recipient of the group message. Also, it is possible to easily verify a group message even in a one-to-one personal message management environment.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Exemplary embodiments will be described in more detail with regard to the figures, wherein like reference numerals refer to like parts throughout the various figures unless otherwise specified, and wherein.

Figure 1:
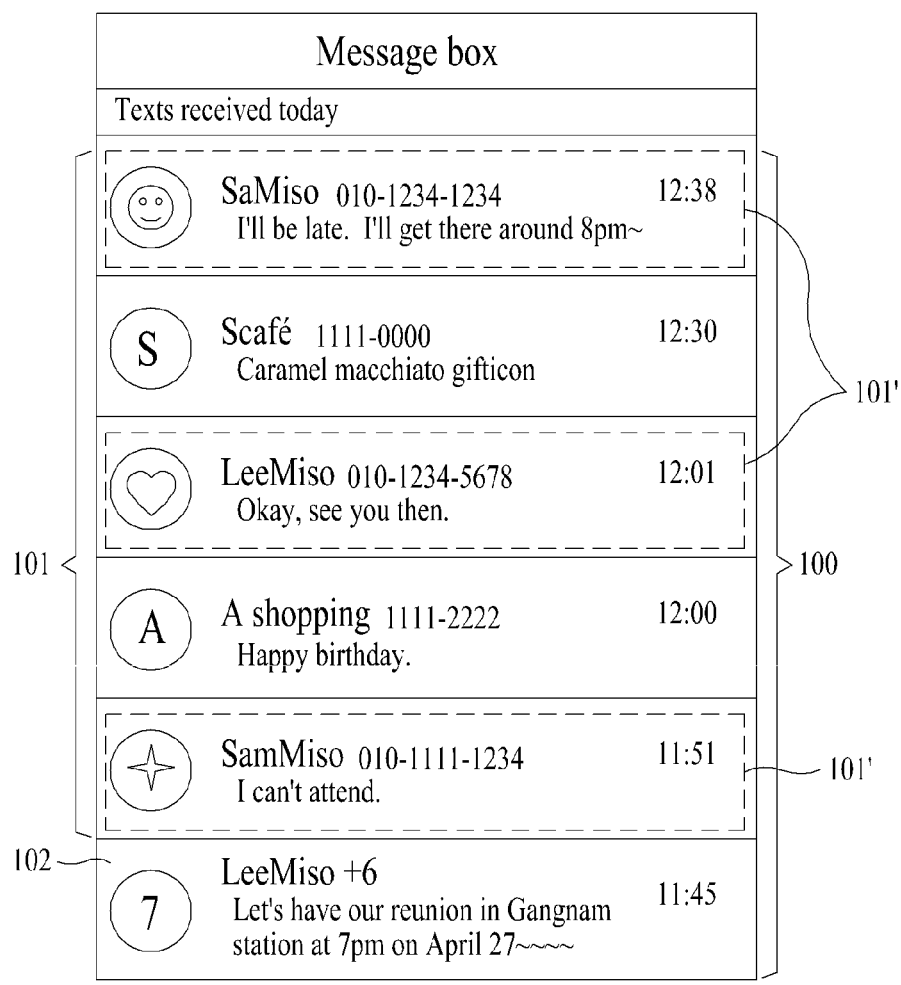
FIGS. 1 through 3 illustrate examples of a message saving method according to the related art.

It should be noted that these figures are intended to illustrate the general characteristics of methods and/or structure utilized in certain exemplary embodiments and to supplement the written description provided below. These drawings are not, however, to scale and may not precisely reflect the precise structural or performance characteristics of any given embodiment, and should not be interpreted as defining or limiting the range of values or properties encompassed by exemplary embodiments.

DETAILED DESCRIPTION

One or more exemplary embodiments will be described in detail with reference to the accompanying drawings. Exemplary embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some exemplary embodiments. Unless otherwise noted, like reference characters denote like elements throughout the attached drawings and written description, and thus descriptions will not be repeated.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being on, "connected to", "coupled to", or "adjacent to", another element, the element may be directly on, connected to, coupled to, or adjacent to, the other element, or one or more other intervening elements may be present. In contrast, when an element is referred to as being "directly on", "directly connected to", "directly coupled to", or "immediately adjacent to", another element there are no intervening elements present.

Unless otherwise defined, all terms (including technical and scientific terms) used herein have the same meaning as commonly understood by one of ordinary skill in the art to which exemplary embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Exemplary embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more exemplary embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more exemplary embodiments, computer processing devices may be described as including various functional units that perform various operations and/or functions to increase the clarity of the description. However, computer processing devices are not intended to be limited to these functional units. For example, in one or more exemplary embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more exemplary embodiments may also include one or more data storage devices. The one or more data storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the exemplary embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more data storage devices, and/or the computer programs, program code, instructions, or some combination thereof, may be specially designed and constructed for the purposes of the exemplary embodiments, or they may be known devices that are altered and/or modified for the purposes of exemplary embodiments.

A hardware device, such as a computer processing device, may run an operating system (OS) and one or more software applications that run on the OS. The computer processing device also may access, store, manipulate, process, and create data in response to execution of the software. For simplicity, one or more exemplary embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of exemplary embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, exemplary embodiments will be described with reference to the accompanying drawings.

Exemplary embodiments relate to technology for managing a group message to be transmitted to a plurality of recipients, and more particularly, to a message management method, system, and non-transitory computer-readable medium that may group and manage messages transmitted and received between a user and recipients of a group message based on the group message.

The term "message" used herein refers to a unit of information that is transmitted through a short message service (SMS), a multimedia messaging service (MMS), an enhanced messaging service (EMS), an instant messenger, a social network service (SNS), an email, and the like, and may inclusively indicate any type of data that is transmitted and received between terminals over a communication network.

The following exemplary embodiments will be described by using a text message as an example of a message.

A text saving method according to the related art may sequentially save text messages from newest to oldest based on the time at which the corresponding message was received.

FIG. 1 illustrates an example of a text list 100 in which text messages saved in a message box are sorted from newest to oldest based on the message reception time in response to access to the message box.

The text list 100 may include a text message (hereinafter, an individual message) 101 transmitted and received one-to-one between a user and a single recipient and a text message (hereinafter, a group message) 102 transmitted from the user to a group that includes a plurality of recipients.

If the user receives a reply from a recipient of the group message 102, an existing text saving method processes the text message received as the reply as a text thread between the user and the recipient and indicates the reply of the recipient as the individual message 101 in the text list 100.

Some messages 101' among the individual messages 101 may be replies to the group message 102. Even in this case, some messages 101' may be indicated as part of the individual messages 101 in the text list 100. Thus, the user may not easily retrieve a message received as a reply to the group message 102 from the text list 100 and may not readily verify a group message corresponding to the message received as the reply. That is, there are some difficulties and inconveniences in managing messages according to the related art.

Figure 2:
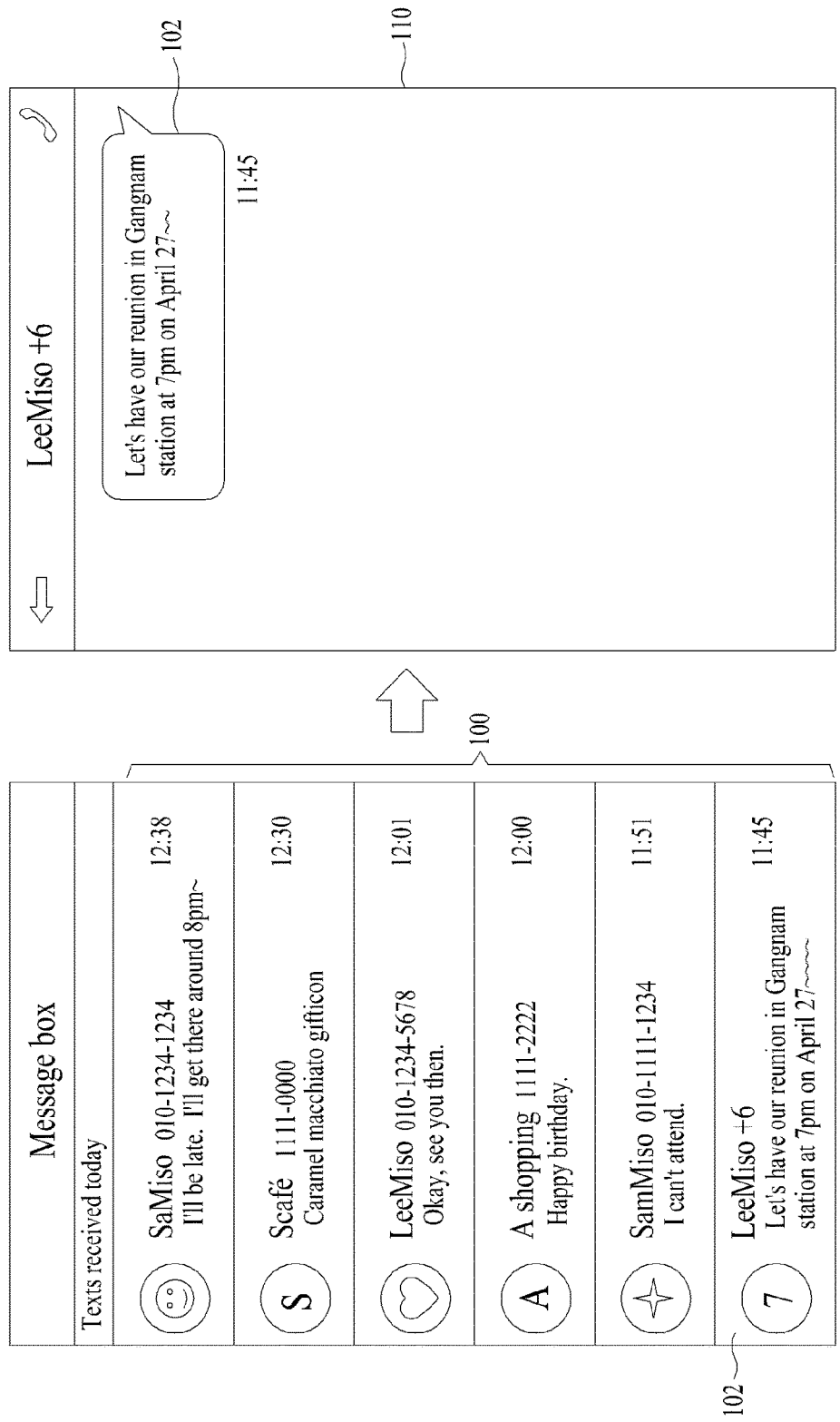
Figure 3:
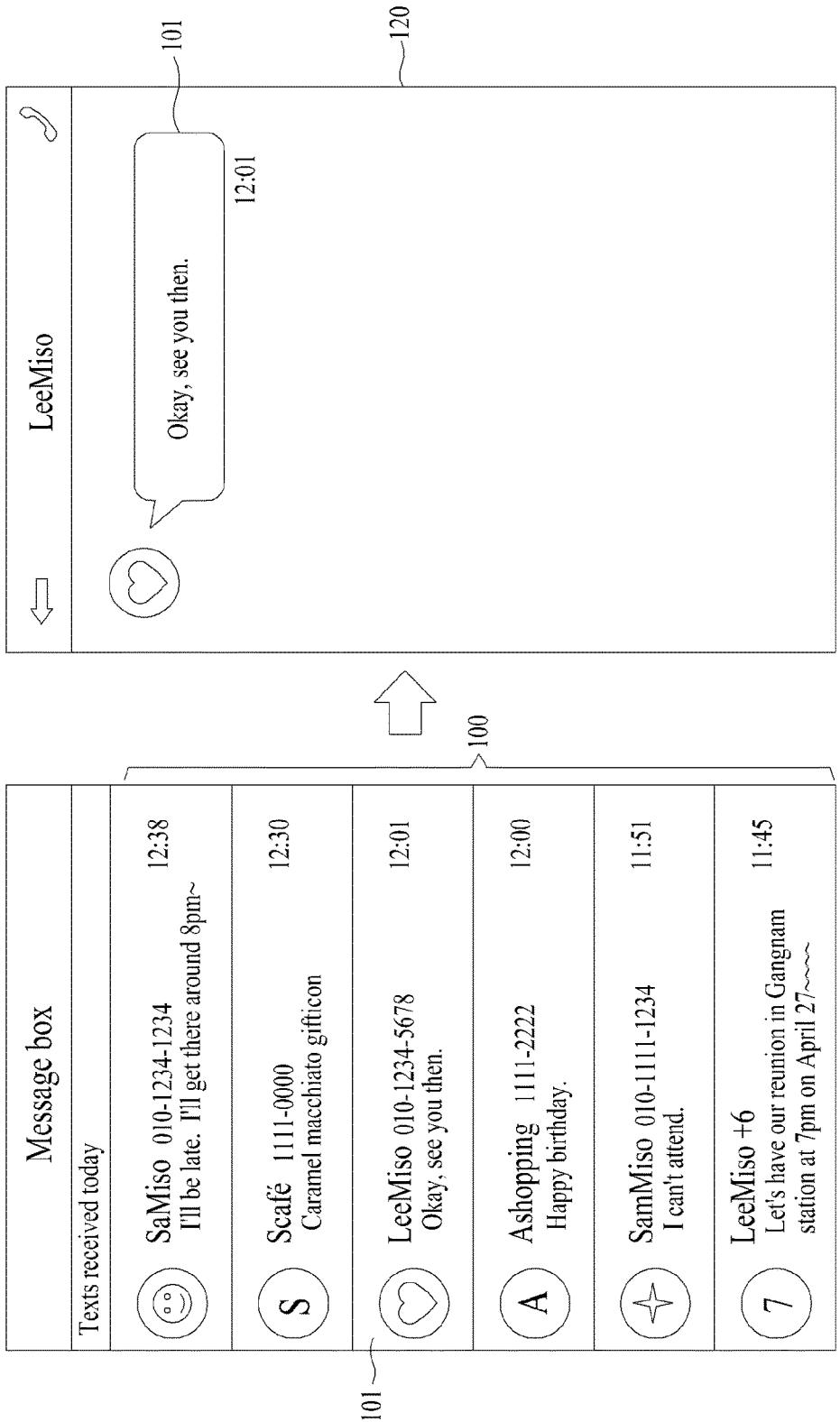

As described above, in the existing text saving method, the individual message 101 and the group message 102 may be processed as separate text threads. Referring to FIG. 2, only the group message 102 may be added to a chatroom 110 provided in response to a selection on the group message 102 from the text list 100. Referring to FIG. 3, only the individual message 101 that is a reply message may be added to a chatroom 120 provided in response to a selection on the individual message, for example, a reply message, 101 received as the reply to the group message 102 from the text list 100. That is, the user may not simultaneously view the group message 102 in the chatroom 110 and the individual message 101 in the chatroom 120, and may have difficulty and some constraints in verifying messages.

To overcome the above issues, the exemplary embodiments relate to grouping and thereby managing messages transmitted and received between a user and recipients of a group message based on the group message.

Figure 4:
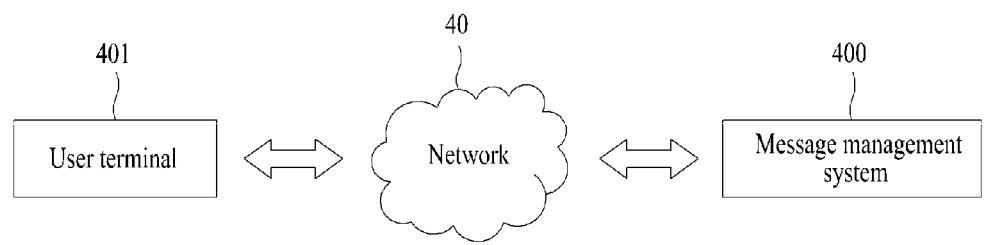
FIG. 4 is a diagram illustrating an example of a message management environment according to at least one exemplary embodiment.

FIG. 4 is a diagram illustrating an example of a message management environment according to at least one exemplary embodiment. FIG. 4 illustrates a user terminal 401 and a message management system 400. In FIG. 4, indicators with arrowheads may indicate that data may be transmitted and received between constituent elements, for example, the user terminal 401 and the message management system 400 over a wired/wireless network 40.

The user terminal 401 may direct one or more processors to execute processes configured to perform at least one of features described herein. The user terminal 401 refers to any type of mobile device capable of installing and executing a service exclusive application (hereinafter, a message app) associated with the message management system 400. The user terminal 401 may perform the overall service operation, such as providing a service screen configuration, data input, data transmission and reception, and data storage, under control of the message app.

For example, the user terminal 401 may include a personal computer (PC), a notebook computer, a laptop computer, a smartphone, a tablet, a wearable computer, etc. However, the user terminal 401 is not limited thereto.

The user terminal 401 may directly or indirectly connect to the network 40, for example, the Internet, a local area network (LAN), etc. For example, a PC and a notebook computer may be directly connected to the network 40 through a wired network connection. A laptop computer may be wirelessly connected to the network 40 through a wireless communication channel set between the laptop computer and a wireless access point (WAP). A smartphone may be wirelessly connected to the network 40 through a wireless communication channel set between the smartphone and a cellular network/bridge. Here, the network 40 may communicate with one or more secondary networks (not shown), for example, a LAN, a wide area network (WAN), and an intranet, however, it is not limited thereto.

The user terminal 401 may interface with the message management system 400 over the network 40.

The message management system 400 may direct one or more processors that are configured to perform at least one of the features described herein. The message management system 400 may provide a message management environment including a message box associated with the user terminal 401 to the user terminal 401. Here, the user terminal 401 is a client in which a message app is installed. In particular, the message management system 400 may group a group message and any relevant message(s) so that a user may easily verify a message.

The message app is configured to be available in a mobile environment in addition to a PC environment. The message app may be configured in an independently operating program form to operate in conjunction with a specific application, for example, a messaging application such as an SMS or an MMS, a messenger application, a mail application, an SNS application, etc., it may be associated with a message, or it may be configured in an in-app form of the specific application to be operable on the application.

At least a portion of constituent elements of the message management system 400 may be configured in the form of an application installed on the user terminal 401, or it may be configured to be included in a platform that provides a service in a client-server environment.

The message management system 400 corresponds to a server computer and may include, for example, a server computing device, a PC, a server computer, a series of server computers, a mini computer, and/or a main frame computer, however, it is not limited thereto. The server computer may be a distributive system, and operations of the server computer may be concurrently and/or sequentially executed on one or more processors.

Figure 5:
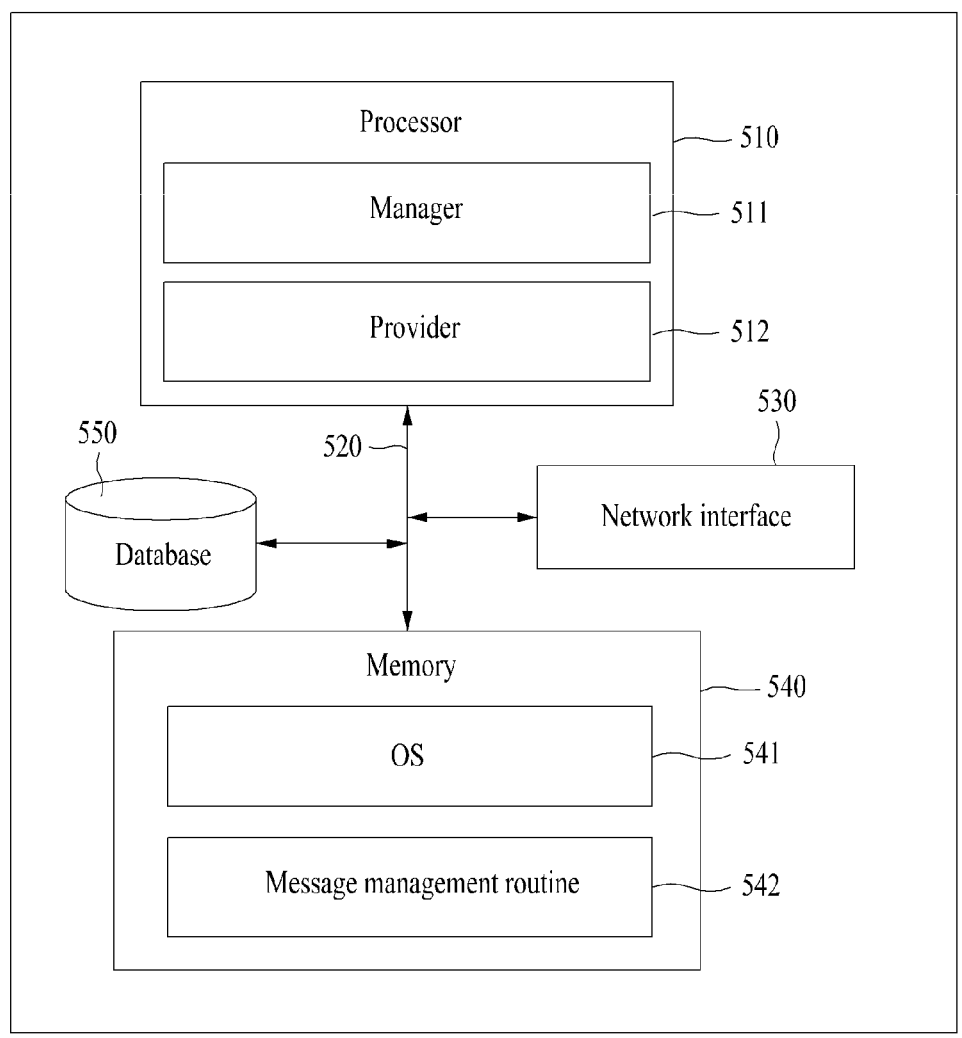
FIG. 5 is a block diagram illustrating a configuration of a message management system according to at least one exemplary embodiment.
Figure 6:
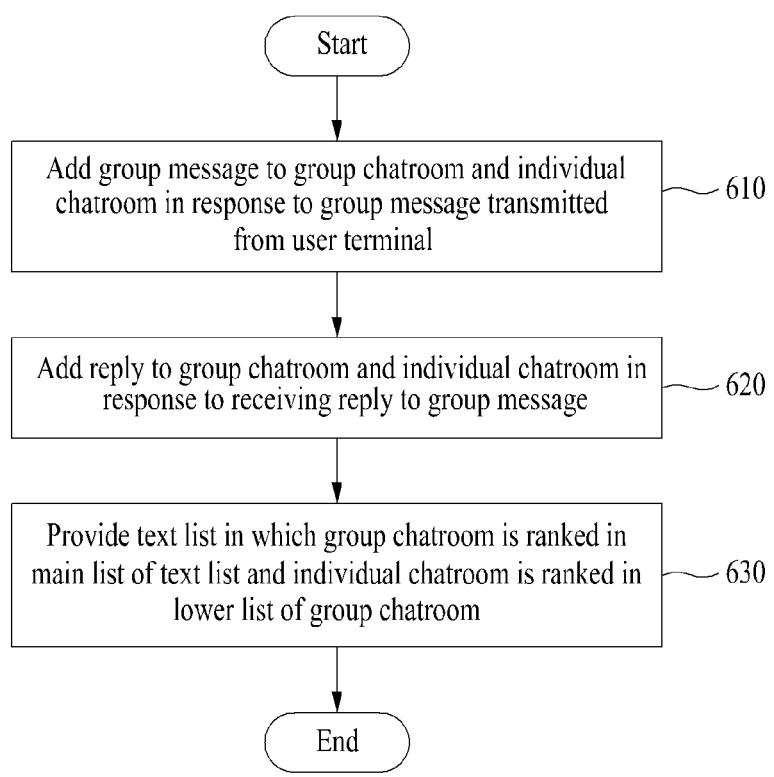
FIG. 6 is a flowchart illustrating a message management method according to at least one exemplary embodiment.

FIG. 5 is a block diagram illustrating a configuration of a message management system according to at least one exemplary embodiment, and FIG. 6 is a flowchart illustrating a message management method according to at least one exemplary embodiment.

Referring to FIG. 5, this embodiment of the message management system 400 includes a processor 510, a bus 520, a network interface 530, a memory 540, and a database 550. The memory 540 includes an operating system (OS) 541 and a message management routine 542 stored therein. The processor 510 includes a manager 511 and a provider 512. According to other exemplary embodiments, the message management system 400 may include a greater or lesser number of constituent elements than the number of constituent elements shown in FIG. 5. However, there is no need to clearly illustrate many constituent elements according to the related art. For example, the message management system 400 may include other constituent elements, such as a display, a transceiver, etc.

The memory 540 may include a permanent mass storage device, such as random access memory (RAM), read only memory (ROM), a disk drive, etc., as a computer-readable storage medium. Also, program codes (e.g., computer-readable instructions) for the OS 541 and the message management routine 542 may be stored in the memory 540. Such software constituent elements may be loaded from another computer-readable storage medium separate from the memory 540 using a drive mechanism (not shown). Such other computer-readable storage medium may include, for example, a floppy drive, a disk, a tape, a DVD/CD-ROM drive, a memory card, etc. Software constituent elements may be loaded to the memory 540 through the network interface 530 instead of, or in addition to, the computer-readable storage medium.

The bus 520 enables communication and data transmission between the constituent elements of the message management system 400. The bus 520 may be configured using a high-speed serial bus, a parallel bus, a storage area network (SAN), and/or another appropriate communication technology.

The network interface 530 may be a computer hardware constituent element for connecting the message management system 400 to the computer network. The network interface 530 may connect the message management system 400 to the computer network through a wireless and/or wired connection.

The database 550 may be used to maintain a message box and may serve to store and maintain messages transmitted from and received by the user through the user terminal 401. In general, a message stored in the database 550 preferably includes time information. Thus, the database 550 may manage messages based on a timeline, and may classify and manage messages based on date, sender, recipient, etc. In particular, the database 550 includes information used to manage messages based on a group unit, for example, identification information for each text message. Using identification information for each text message, text messages may be individually managed and may be managed based on a group unit by representing a relationship between the text messages.

Although FIG. 5 illustrates that the database 550 is included in the message management system 400, it is an example only. Thus, the database 550 may be omitted based on a system configuration method, environment, etc. Alternatively, an entire database or a portion of the database may be present as an external database constructed on a separate system. Additionally, the database 550 may be configured as a local database that is included in an application installed on the user terminal 401.

The processor 510 may be configured to process computer-readable instructions of a computer program by performing basic arithmetic operations, logic operations, and input/output operations of the message management system 400. The computer-readable instructions may be provided from the memory 540 and/or the network interface 530 to the processor 510 through the bus 520. The processor 510 may be configured to execute program codes for the manager 511 and the provider 512. The program codes may be stored in a data storage device, such as the memory 540.

The manager 511 and the provider 512 may be configured to perform operations 610 through 630 of FIG. 6.

Once a group message is transmitted to a plurality of recipients, the manager 511 groups and thereby manages the transmitted group message and text messages that were received and transmitted in association with the group message based on the group message, in this embodiment.

Referring to FIG. 6, in operation 610, in response to a group message transmitted from a user terminal to a group that includes a plurality of recipients, the manager 511 creates a chatroom that includes the group message, for example, a chatroom (hereinafter, a group chatroom) in which the plurality of recipients are set as conversation parties. In particular, in response to the group message transmitted from the user terminal, the manager 511 adds the group message to a chatroom with an individual recipient included in a group, for example, a chatroom (hereinafter, an individual chatroom) in which each individual recipient is set as a conversation party. That is, the manager 511 adds the group message to a text thread of the corresponding group, and also adds the group message to a personal text thread of each recipient with respect to all of the recipients included in the group. Even when it is hard to form a group chatroom, or even when sharing of contents with an entire group is not preferable though an entire group communication is needed, it is possible to make it easy to identify a group message.

In operation 620, when the manager 511 receives an individual message from any of at least one individual recipients among the plurality of recipients included in the group, the manager includes a corresponding individual message in the individual chatroom of a recipient that transmitted the individual message among individual chatrooms created in association with the respective recipients included in the group. Here, in response to receiving a reply message transmitted from a recipient that received the group message to the user terminal, the manager 511 processes the reply message as a personal text thread and adds the reply message to an individual chatroom set between the user and the recipient that transmitted the reply message. Further, the manager 511 also adds the reply message to a group chatroom by adding the reply message to a group text thread of a group message corresponding to an original message. For example, identification information of the original message to be replied to may be included in the reply message together with identification information of the reply message. Through this, it is possible to identify a group message associated with the reply message and to add an individual message processed as a personal text thread to a group chatroom.

In operation 630, in response to the user connecting to a message box through the user terminal, the provider 512 may provide a text list stored in the message box. Here, a group chatroom including the group message and an individual chatroom that includes an individual message transmitted between the user and a recipient of the group may be configured as a bundled item. For example, when configuring a text list of a message box, the provider 512 may rank a group chatroom to which a group message is added in a main list of the text list, and may rank an individual chatroom to which a reply message is added in a lower list of the group chatroom. The provider 512 may rank an individual chatroom through which messages are transmitted and received one-to-one between the user and each of recipients included in a group before a transmission point in time of the group message to the lower list of the group chatroom. Alternatively, the provider 512 may newly create an individual chatroom of each of recipients included in a group at a transmission point in time of a group message, and may rank the newly created individual chatrooms in a lower list of a group chatroom. Here, the individual chatrooms ranked in the lower list of the group chatroom may be sorted based on a point in time at which a most recent message included in each individual chatroom is received or transmitted.

The provider 512 may additionally maintain an individual chatroom that includes a message received or transmitted between the user and at least one recipient included in the group as an item separate from the bundled item of the group chatroom. That is, the provider 512 may rank the individual chatroom to which the reply message is added in both the lower list of the group chatroom and the main list of the text list. Accordingly, the provider 512 may configure the text list by grouping messages transmitted and received between the user and recipients of the group message together with the group message based on the group message.

The provider 512 may indicate state information (such as display state or hide state) associated with the group message in at least one of the group chatroom and a representative item separately created in association with the group chatroom in the bundled item. For example, the provider 512 may create an item (hereinafter, a representative item) that represents information associated with a corresponding message with respect to a group message, may indicate the representative item in a text list of a message box as a group chatroom item, and may provide state information of the group message using the representative item. For example, the provider 512 may create a number of message recipients indicating a number of persons to receive a message, set to the group message, whether a reply to the group message is received, the number of non-confirmed reply messages, etc., as a representative item, and may indicate the representative item that includes state information of the group message through the text list of the message box.

FIGS. 7 through 13 illustrate examples of a user interface screen associated with a message box according to at least one exemplary embodiment.

Figure 7:
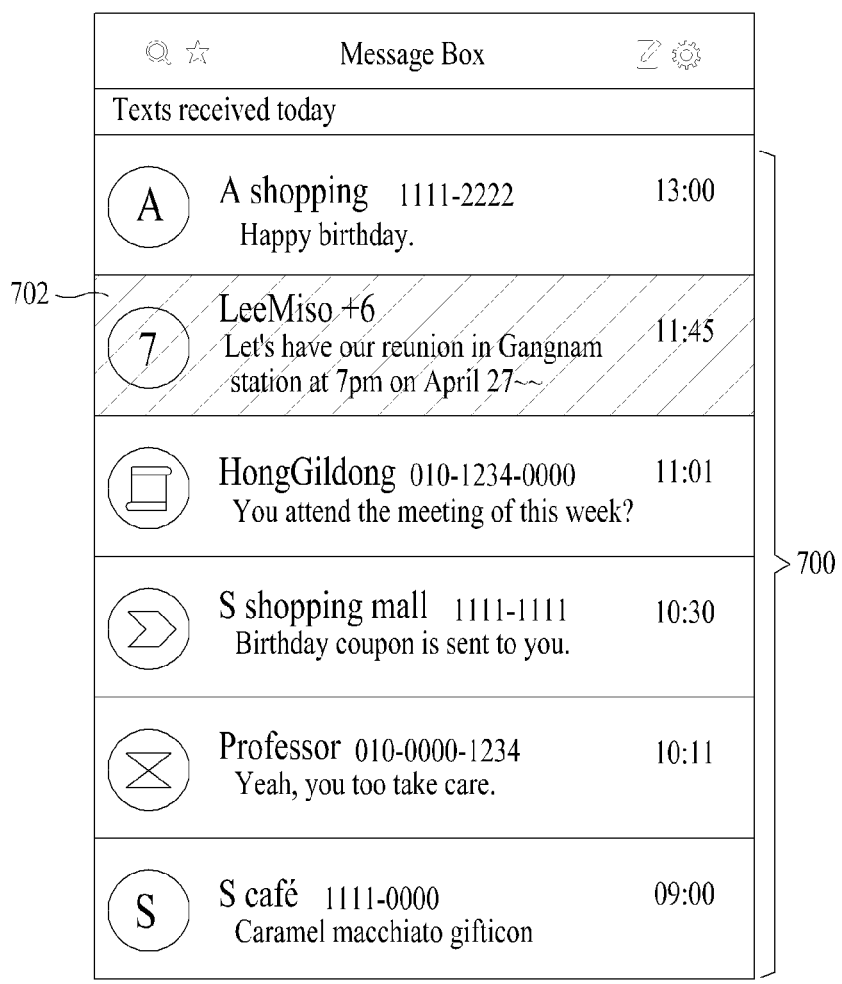
FIGS. 7 through 13 illustrate examples of a user interface screen associated with a message box according to at least one exemplary embodiment.

Referring to FIG. 7, if a group message 702 is ranked in a text list 700 of a message box, the group message 702 may be displayed in a certain manner to be distinguished from individual messages by applying a method of differentiating display attributes of the message cards that constitute the text list 700.

As an example of such a distinguishing display, an identifier indicating a group message may be included in a profile image of the group message 702. For example, the number of message recipients may be indicated on the profile image of the group message 702, or a combination of profile images of the recipients stored in an address book may be indicated on the profile image of the group message 702.

Recipient information of the group message 702 may include a name of a specific recipient in a corresponding group and the remaining member counts, for example, LeeMiso+6. Here, the specific recipient may be determined in alphabetical order. Alternatively, a person initially selected first by a user when setting the group may be determined as the specific recipient.

Content of the group message 702 to be displayed on the text list 700 may be displayed based on a last message. At least partial content of the message added last to a group chatroom corresponding to the group message 702 may be displayed on the text list 700.

The text list 700 may include a function of controlling an item display state and an item hide state with respect to at least a portion of a group chatroom and individual chatrooms. The text list 700 may include a user interface (UI) capable of selecting an unfold, or expand, (display state) and a fold, or contract, (hide state) with respect to a lower list of the group message 702. For example, a group unfold (expand) button and a group fold (contract) button configured as a single UI button may be provided in toggle button form on the group message 702, or a gesture-based UI may be provided to enable a group unfold (expand) and a group fold (contract) by horizontal swiping of the group message 702.

Figure 8:
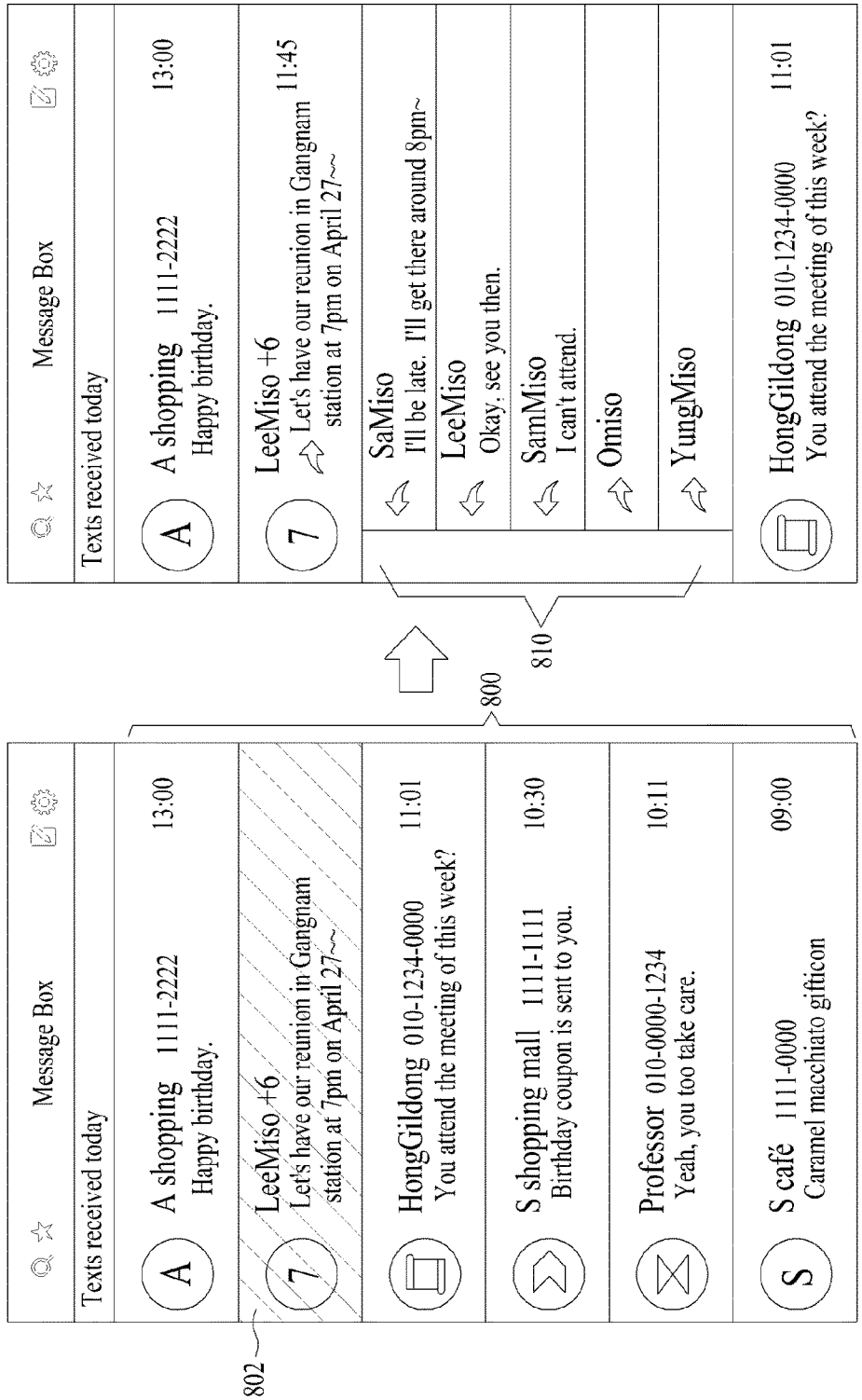

Referring to FIG. 8, in response to a user input of a group unfold (expand) UI for a group message 802 in a text list 800, a lower list 810 including messages transmitted and received between the user and recipients of the group message 802 may be displayed. That is, if a group of the group message 802 is unfolded (expanded), individual chatrooms created in association with recipients in a group may be sorted in the lower list 810 of the group message 802. Here, a recent conversation may be sorted at an upper end of the lower list 810.

If a maximum of, for example, five chatrooms are sorted in response to a selection on the group unfold UI for the group message 802 and the maximum number of recipients or more are included in the group, additional sorting may be performed through page flicking.

Recipient information for each message of the lower list 810 may include at least one of a name and a telephone number of a corresponding recipient. If the telephone number is present in an address book associated with a user terminal, a name stored in the address book may be displayed. Otherwise, the telephone number may be displayed.

At least partial content of a message most recently added to the group chatroom may be displayed in the group message 802. At least partial content of a message most recently added to an individual chatroom may be displayed in the lower list 810 of the group message 802. Here, whether a recently added message is a transmission message (that is, an outgoing message) or a received message (that is, an incoming message) may be indicated using an icon, and information regarding the time at which a message is received (hereinafter, a message received time) may also be indicated.

If a message is received as a reply from a recipient, at least partial content of the received message may be displayed on the lower list 810 of the group message 802. If no reply to the transmitted group message 802 is received, content display may be omitted.

A message received as a reply to the group message 802 may be ranked in both the lower list 810 and the text list 800 corresponding to an upper list, based on a message received time.

Figure 9:
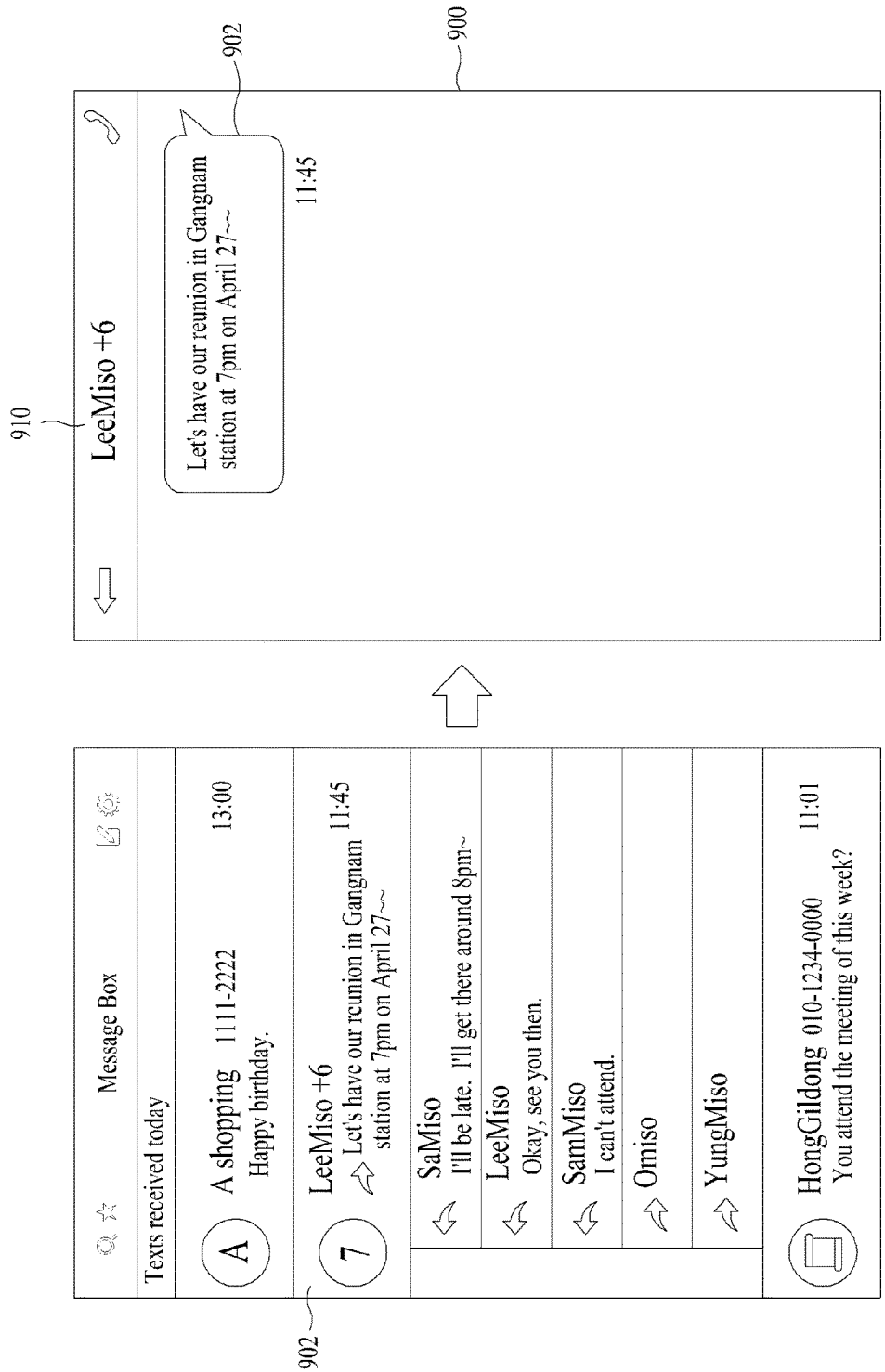

Referring to FIG. 9, in response to selecting a group message 902 from a text list, a user may connect to a group chatroom 900 as a detail text screen. Here, the group message 902 transmitted from the user to a corresponding group may be additionally displayed on the group chatroom 900.

In response to selecting recipient information 910 on the group chatroom 900, information of the recipient(s) of the group message 902 may be provided. If a telephone number of the recipient is present in an address book associated with a user terminal, a name and the telephone number of the recipient may be displayed as recipient information. If the telephone number is absent from the address book, the telephone number alone may be displayed without the name. Recipient information may be sorted in order of names, in order of which recipients are added to the address book, and the like. Recipient information may be provided as a list that includes all of the recipients. Alternatively, profile cards that include information of at least one recipient may be sequentially provided in sorting order.

Figure 10:
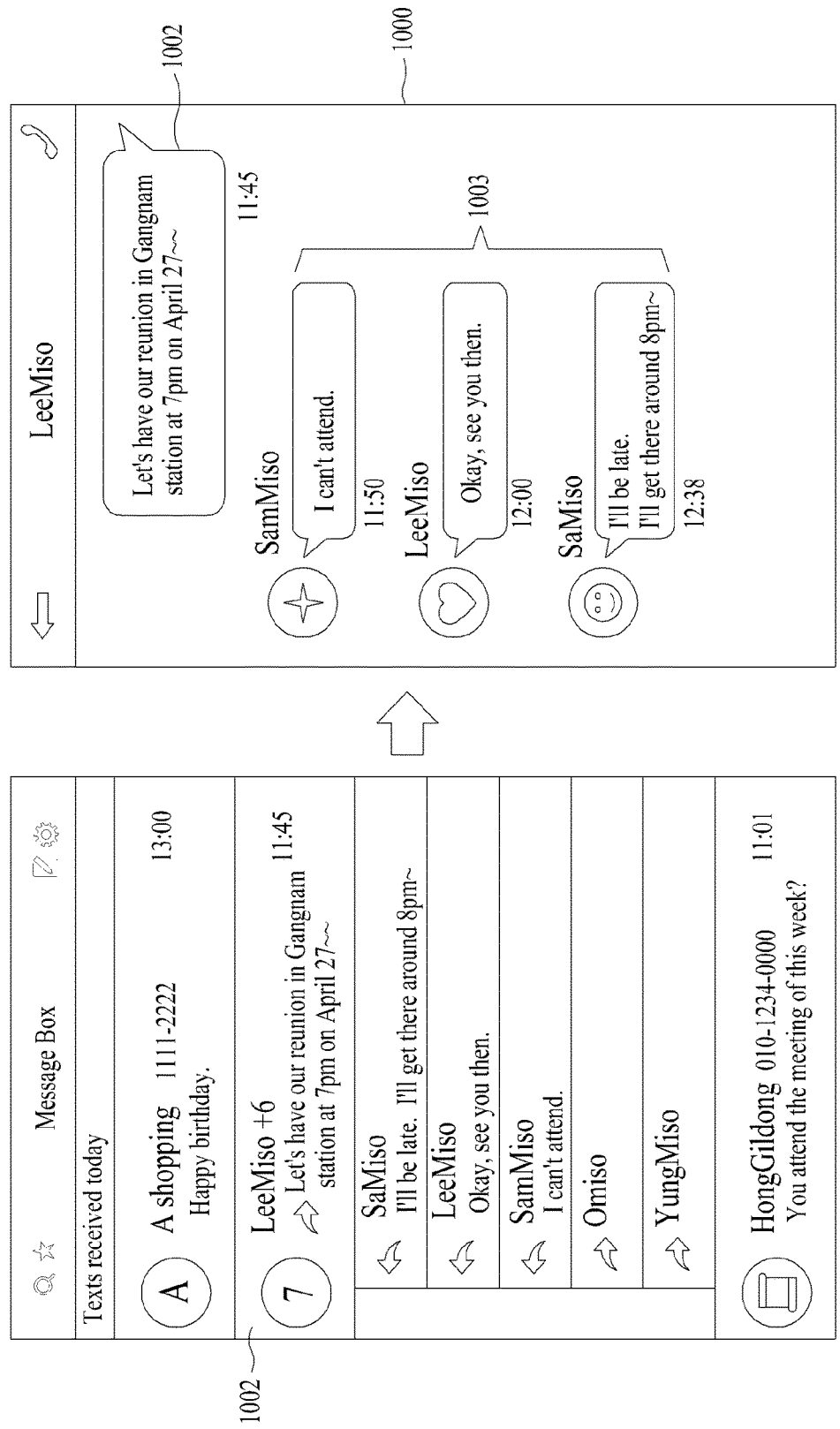

As another example, referring to FIG. 10, in response to selecting a group message 1002 from a text list, a user may connect to a group chatroom 1000 as a detail text screen. Here, the group message 1002 and messages 1003 transmitted and received between the user and recipients of the group message 1002 may be displayed on the group chatroom 1000. That is, if a recipient transmits a reply message to the group message 1002, the reply message may be added to the group chatroom 1000 of the user terminal that receives the reply message and may be displayed together with the group message 1002.

Figure 11:
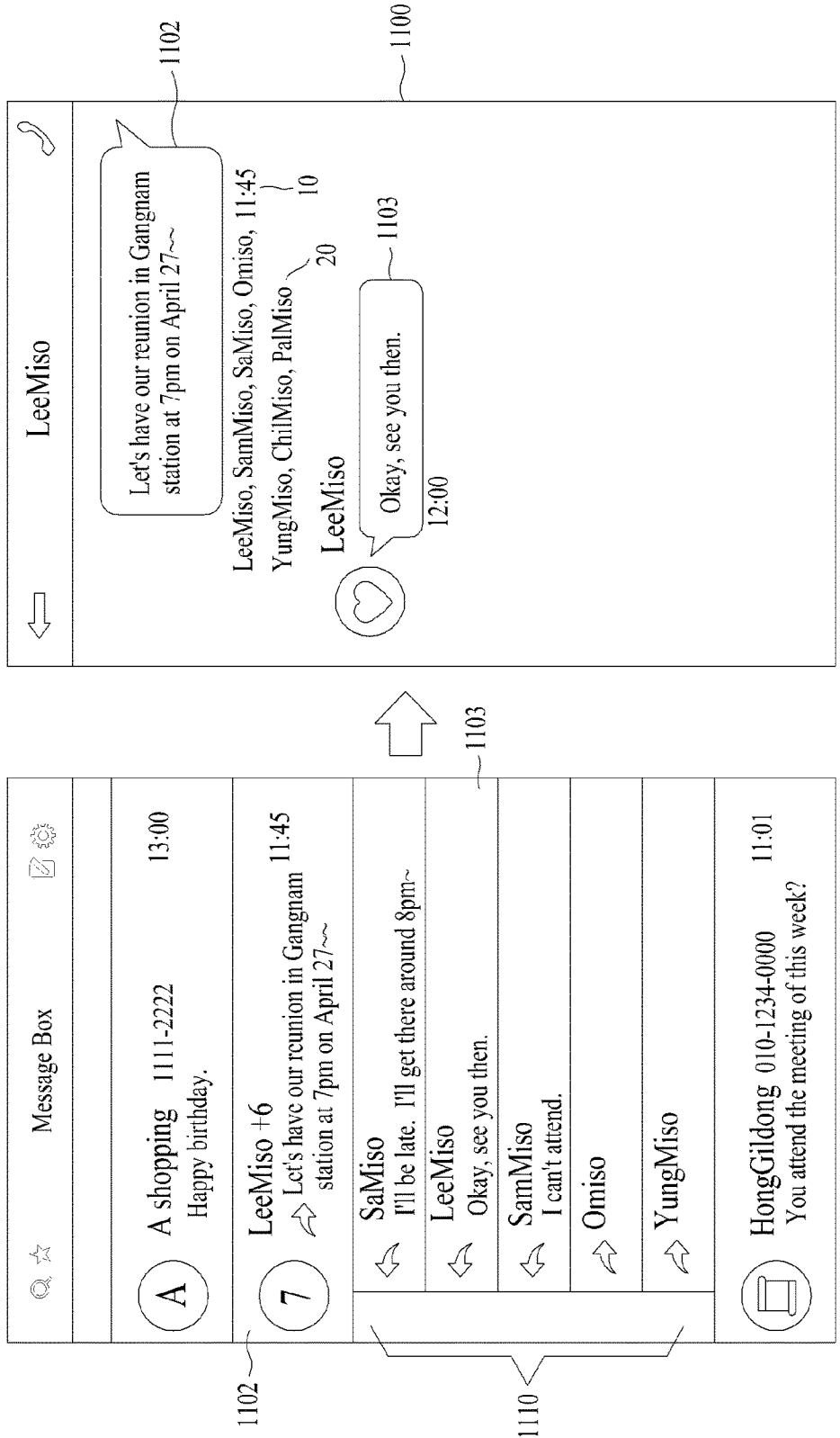
Figure 12:
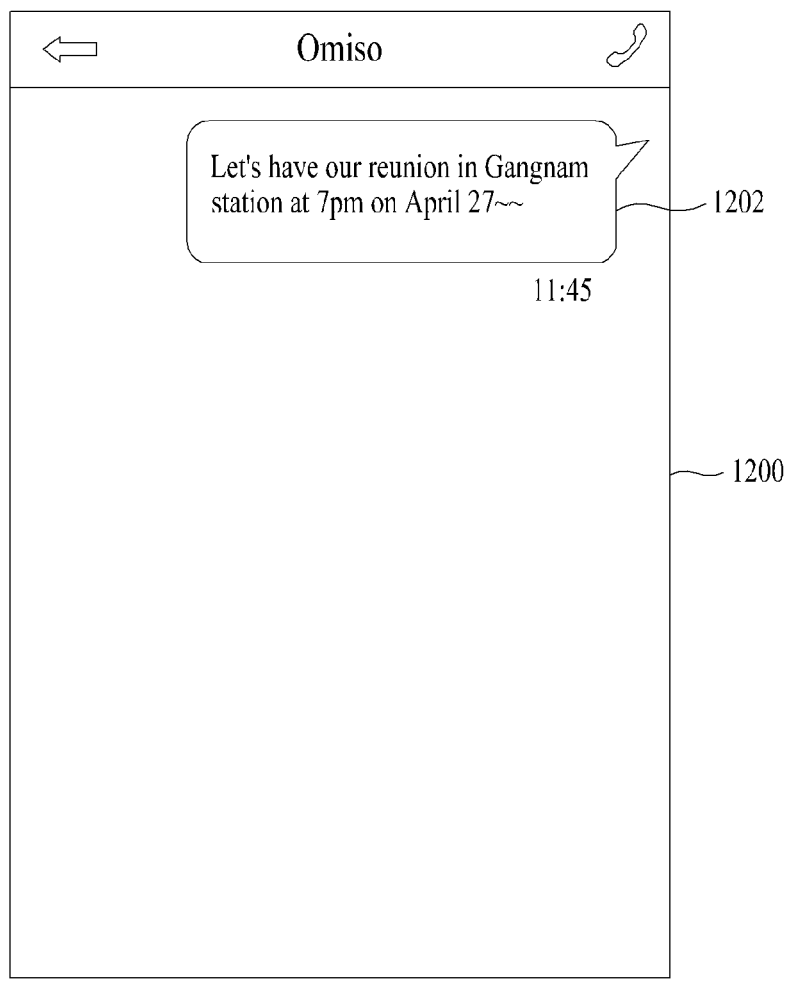

Referring to FIG. 11, in response to selecting a message 1103 of a specific recipient from a lower list 1110 of a group message 1102, a user may connect to an individual chatroom 1100 as a detail text screen. Here, the group message 1102 and the individual message 1103 transmitted and received between the user and the recipient may be added to and displayed on the individual chatroom 1100.

For example, previous messages transmitted and received between the user and a recipient before a transmission point in time of the group message 1102 may be included in the individual chatroom 1100, and the group message 1102 may be inserted after the previous messages and then displayed. As another example, the individual chatroom 1100 may be newly created at a point in time at which the group message 1102 is transmitted. The group message 1102 and the individual messages 1103 transmitted to and received from the recipient after the point in time at which the group message 1102 may be added to and displayed on the individual chatroom 1100.

If the group message 1102 is displayed on the individual chatroom 1100, a time 10 at which the group message 1102 is transmitted and information 20 about recipients to which the group message 1102 is transmitted may be displayed together. That is, if the group message 1102 is displayed on an individual thread, recipients of the group message may be indicated through a recipient list and a counter party may determine that a message received by the counter party is a group message also transmitted to other persons. As another example, instead of displaying information about recipients to which a group message is transmitted on an individual chatroom, an identifier indicating that a corresponding message is a group message may be displayed. In this case, a counter party may not determine that the message received from the user is transmitted to whom, however, they may determine that the message is a group message based on the identifier. When displaying a group message on an individual chatroom, whether to display a recipient list or an identifier may be determined based on settings of the user that transmits the group message.

A group message may be added to an individual chatroom in which messages are transmitted and received one to one between the user and a recipient of the group message. Thus, referring to FIG. 12, although no reply is received from a recipient, an individual chatroom 1200 may be opened through a lower list of a group message 1202, and the group message 1202 may be additionally displayed on the individual chatroom 1200.

FIGS. 8 through 11 illustrate examples of displaying a lower list in which messages transmitted and received between a user and recipients included in a group are sorted based on a time at which a corresponding message is received/transmitted in response to an input of a group fold UI for a group message. However, the exemplary embodiments are not limited thereto.

Figure 13:
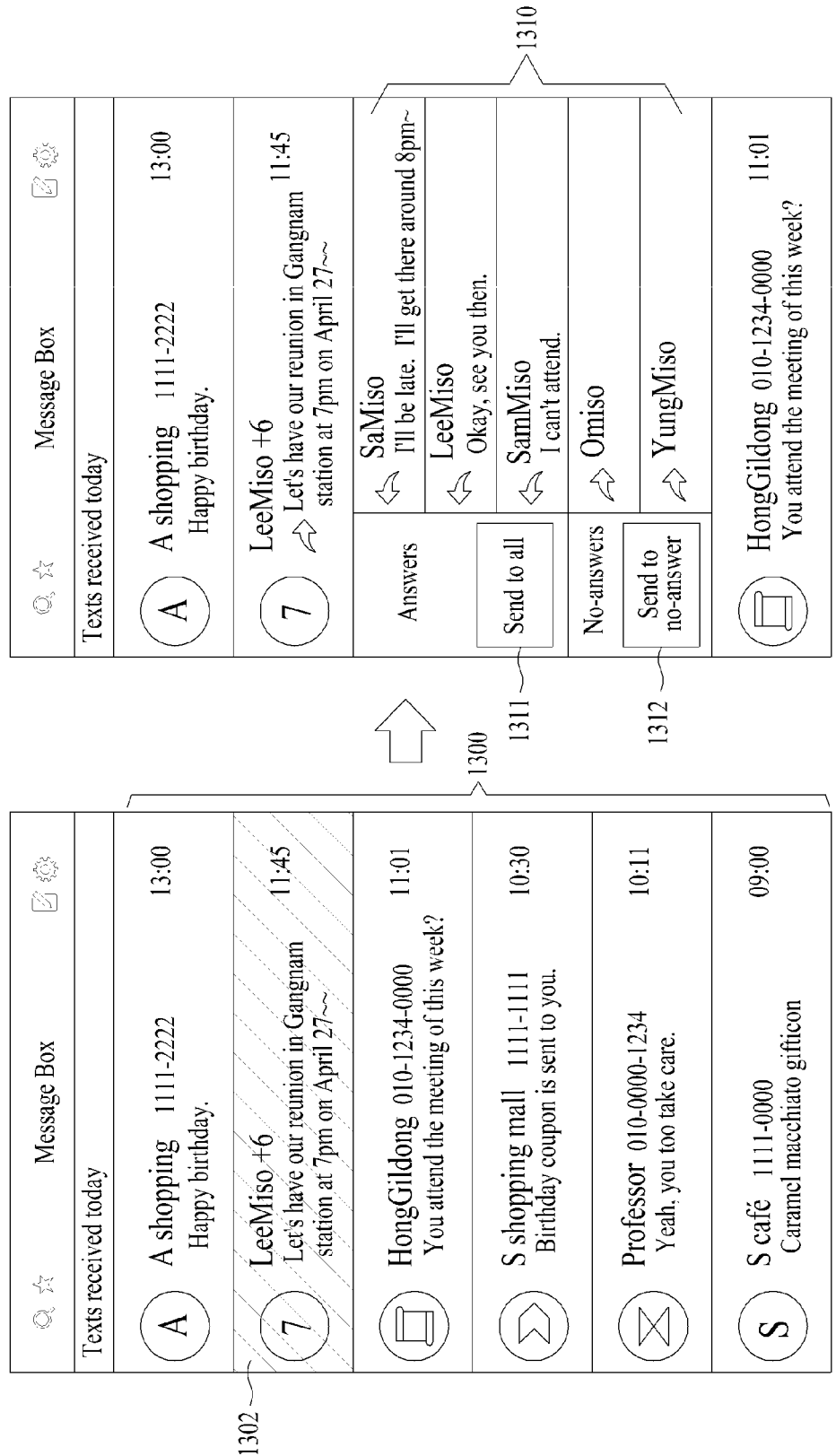

For example, referring to FIG. 13, in response to a user input of a group unfold (expand) UI for a group message 1302 in a text list 1300, a lower list 1310 that includes messages transmitted and received between the user and recipients of the group message 1302 may be displayed. Here, an individual chatroom (hereinafter, an answerer list) of recipient(s) that have replied to the group message 1302 and an individual chatroom (hereinafter, a no-answerer list) of recipient(s) that have not replied to the group message 1302 may be distinguishingly displayed on the lower list 1310. The answerer list and the no-answerer list may be distinguishingly displayed on the lower list 1310. In each of the answerer list and the no-answerer list, a recent incoming conversation may be sorted at an upper end within each corresponding list.

The lower list 1310 may include a 'send to all' button 1311 indicating a function capable of transmitting a new message to the entire recipients of a group, a 'send to no-answer' button 1312 indicating a function capable of simultaneously transmitting a new message to recipients included in the no-answerer list among recipients in the group, and the like. That is, a new message may be transmitted to the entire group of recipients (including both answerers and or no-answerers) based on a selection, using both the 'send to all' button 1311 and the 'send to no-answer' button 1312, or it may be selectively sent to either the answerers only, using button 1311 only, or the non-answerers only, using button 1312 only.

A message management method according to exemplary embodiments may enhance the convenience in managing messages by grouping and managing messages, for example, a reply message, associated with a group message based on the group message.

The message management method may include a further reduced number of operations or additional operations based on the detailed description of the message management system described above with reference to FIGS. 1 through 13. Also, two or more operations may be combined and the order or locations of operations may be changed.

Screens of FIGS. 7 through 13 are provided to help the understanding of the disclosure and clarity of the description. Thus, a configuration or the order of the sections of a screen may be modified.

Figure 14:
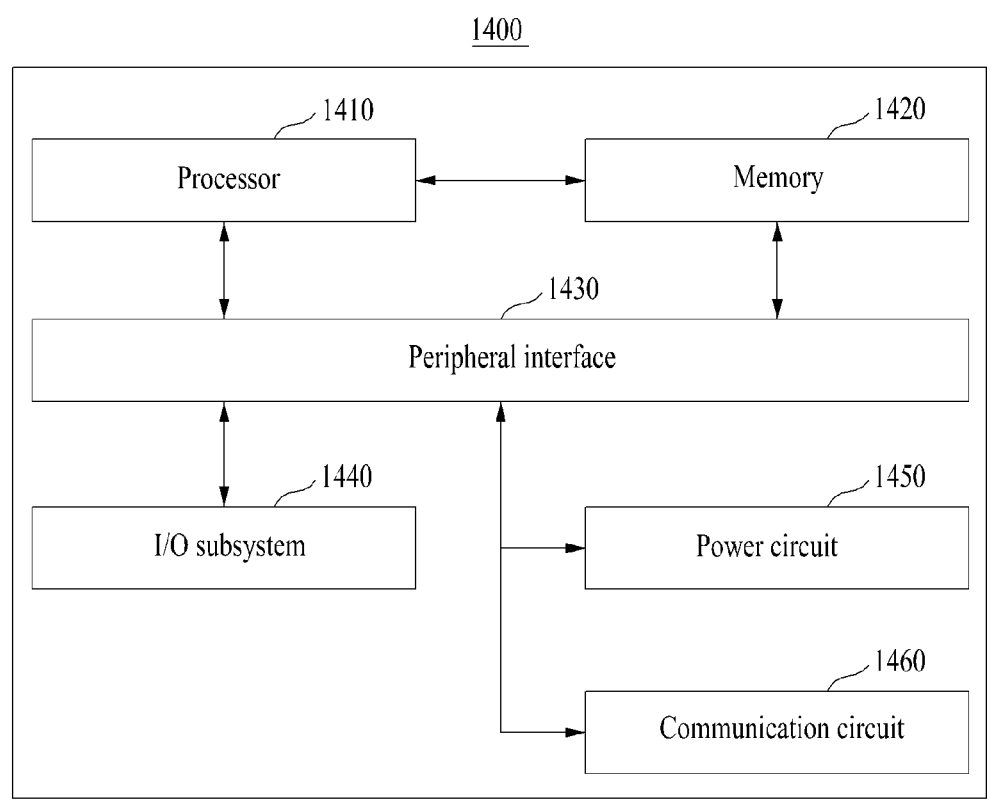
FIG. 14 is a block diagram illustrating a configuration of a computer system according to at least one exemplary embodiment.

FIG. 14 is a block diagram illustrating a configuration of a computer system according to at least one exemplary embodiment. Referring to FIG. 14, a computer system 1400 of this embodiment includes at least one processor 1410, a memory 1420, a peripheral interface 1430, an input/output (I/O) subsystem 1440, a power circuit 1450, and a communication circuit 1460. The computer system 1400 may correspond to a user terminal.

The memory 1420 may include, for example, a high-speed random access memory (HSRAM), a magnetic disk, a static random access memory (SRAM), a dynamic RAM (DRAM), read only memory (ROM), a flash memory, and a non-volatile memory. The memory 1420 may include a software module, an instruction set, or a variety of data as required for operation of the computer system 1400. Here, access from another component such as the processor 1410 and the peripheral interface 1430 to the memory 1420 may be controlled by the processor 1410.

The peripheral interface 1430 may couple an input device and/or an output device of the computer system 1400 with the processor 1410 and the memory 1420. The processor 1410 may perform a variety of functions for the computer system 1400 and may process data by executing the software module or the instruction set stored in the memory 1420.

The I/O subsystem 1440 may couple various I/O peripheral devices with the peripheral interface 1430. For example, the I/O subsystem 1440 may include a controller for coupling the peripheral interface 1430 and a peripheral device, such as a monitor, a keyboard, a mouse, a printer, and a touch screen or a sensor depending on a necessity. The I/O peripheral devices may be coupled with the peripheral interface 1430 without using the I/O subsystem 1440.

The power circuit 1450 may supply power to all of or a portion of the components of a terminal. For example, the power circuit 1450 may include a power management system, at least one power source such as a battery or alternating circuit (AC), a charge system, a power failure detection circuit, a power converter or inverter, a power status indicator, or other components for creating, managing and distributing power.

The communication circuit 1460 enables communication with another computer system using at least one external port. Alternatively, as described above, the communication circuit 1460 may enable communication with another computer system by including a radio frequency (RF) circuit and thereby transmitting and receiving an RF signal known as an electromagnetic signal.

The embodiment of FIG. 14 is only an example of the computer system 1400. The computer system 1400 may have a configuration or an arrangement in which a portion of the components illustrated in FIG. 14 have been omitted, or it may further include components that are not illustrated in FIG. 14, or it may include the coupling of two or more components. For example, a computer system for a communication terminal of a mobile environment may further include a touch screen, a sensor, and the like, in addition to the components of FIG. 14. A circuit for RF communication using a variety of communication methods, for example, wireless fidelity (Wi-Fi), 3rd generation (3G), long term evolution (LTE), Bluetooth, near field communication (NFC), and ZigBee, may be included in the communication circuit 1460. Components includable in the computer system 1400 may be configured as hardware that includes an integrated circuit specified for at least one signal processing or application, software, or a combination of hardware and software.

As described above, according to some exemplary embodiments, it is possible to further effectively manage messages by grouping and thereby saving a group message transmitted to a plurality of recipients and messages transmitted and received between a user and recipients of the group message based on the group message. Thus, it is possible to easily and conveniently verify messages relevant to the group message. Also, according to some exemplary embodiments, it is possible to manage messages based on a group unit by adding and thereby saving a group message to a one-to-one chatroom created between a user and a recipient of the group message. Also, it is possible to easily verify a group message even in a one-to-one personal message management environment.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For the purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The exemplary embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular exemplary embodiment are generally not limited to that particular embodiment, but, where applicable, are interchangeable and can be used in any other selected embodiment, even if not specifically shown or described. The same may also be varied in many ways. Such variations are not to be regarded as a departure from the disclosure, and all such modifications are intended to be included within the scope of the disclosure.

What is claimed is:

1. A message management system comprising:
    a processor having a plurality of functional units for performing a plurality of corresponding functions, the functional units including:
        a manager configured to create a group chatroom that includes a group message in response to receiving the group message sent to a plurality of recipients from a terminal of a user, and to include an individual message in an individual chatroom that is created in association with each of the plurality of recipients in response to receiving the individual message from a terminal of at least one recipient among the plurality of recipients; and
        a provider configured to display and provide on a user interface the group chatroom and the individual chatroom as a bundled item, wherein the group chatroom displays the group message on the user interface and the individual chatroom displays the individual message on the user interface,
    wherein a plurality of individual chatrooms are provided and further wherein the plurality of individual chatrooms are divided into an answerer list of recipients who have replied to the group message and a no-answerer list of recipients who have not replied to the group message, and further wherein a first function is provided to simultaneously send a new message to all recipients on the answerer list and a second function is provided to simultaneously send a new message to all recipients on the no-answerer list, and
    wherein the system further comprises a memory, a network interface, a database, and a bus, wherein the bus is configured and arranged for communication and data transmission between the processor, the memory, the database, and the network interface.

2. The message management system of claim 1, wherein the group message is included in the individual chatroom.

3. The message management system of claim 1, wherein the individual chatrooms are sorted based on a point in time at which a most recent message included in each individual chatroom is received or transmitted in the bundled item.

4. The message management system of claim 1, wherein the individual chatroom is provided as a lower list of the group chatroom in the bundled item.

5. The message management system of claim 1, wherein the individual chatroom is classified into an individual chatroom that includes the individual message as a reply to the group message or a remaining individual chatroom in the bundled item.

6. The message management system of claim 1, wherein, in the bundled item, at least a portion of items of the group chatroom and the individual chatroom are controllable to be in either a display state or a hide state.

7. The message management system of claim 1, wherein the provider is further configured to add the group message to the individual message and display the added group message in response to receiving a selection on the individual chatroom in the bundled item from the terminal of the user, and
    an individual message received or transmitted between a corresponding recipient and the user before a transmission point in time of the group message is further included in the individual chatroom.

8. The message management system of claim 1, wherein an individual chatroom that includes a message received or transmitted between at least one recipient among the plurality of recipients and the user is additionally maintained as an item separate from the bundled item.

* * * * *